(12) United States Patent
Vanneste et al.

(10) Patent No.: US 7,089,723 B2
(45) Date of Patent: Aug. 15, 2006

(54) MULTI-LAYER STEEL CORD WHERE INTERMEDIATE FILAMENTS ARE COATED WITH A POLYMER

(75) Inventors: Stijn Vanneste, Ingelmunster (BE); Steven Wostyn, Desselgem (BE); Dirk Meersschaut, Ooigem (BE)

(73) Assignee: NV Bekaert SA, Zwevegem (BE)

( * ) Notice: Subject to any disclaimer, the term of this patent is extended or adjusted under 35 U.S.C. 154(b) by 25 days.

(21) Appl. No.: 10/491,592

(22) PCT Filed: Sep. 9, 2002

(86) PCT No.: PCT/EP02/10022

§ 371 (c)(1), (2), (4) Date: Apr. 2, 2004

(87) PCT Pub. No.: WO03/031716

PCT Pub. Date: Apr. 17, 2003

(65) Prior Publication Data

US 2005/0037197 A1 Feb. 17, 2005

(30) Foreign Application Priority Data

Oct. 3, 2001 (EP) ................................. 01203804

(51) Int. Cl.
  *D02G 3/02* (2006.01)
(52) U.S. Cl. ......................................... 57/212; 57/223
(58) Field of Classification Search .................. 57/213, 57/217, 221, 223, 232, 902, 212
  See application file for complete search history.

(56) References Cited

U.S. PATENT DOCUMENTS

| | | | |
|---|---|---|---|
| 3,391,531 A | | 7/1968 | Riggs |
| 4,534,162 A | * | 8/1985 | Riggs et al. .................. 57/217 |
| 4,602,476 A | * | 7/1986 | Riggs et al. .................. 57/214 |
| 4,635,432 A | * | 1/1987 | Wheeler ....................... 57/221 |
| 4,667,462 A | * | 5/1987 | Smyth ......................... 57/217 |
| 5,279,695 A | * | 1/1994 | Starinshak et al. ......... 156/296 |
| 5,687,557 A | | 11/1997 | De Vos et al. |
| 2004/0045652 A1 | * | 3/2004 | Vanneste et al. ............ 152/451 |

FOREIGN PATENT DOCUMENTS

WO    WO 99/31313 A1    6/1999

* cited by examiner

*Primary Examiner*—Shaun R Hurley
(74) *Attorney, Agent, or Firm*—Foley & Lardner LLP

(57) ABSTRACT

A steel cord comprises a core with one or more core steel filaments and further comprises a first layer of intermediate steel filaments twisted around the core, and a second layer of second steel filaments twisted around the first layer. At least one of the intermediate steel filaments is individually coated by means of a polymer with a minimum thickness of 0.010 mm. The polymer reduces the fretting between the coated intermediate steel filaments and the other steel filaments and makes the steel cord suitable for reinforcement of carcass plies of a tire.

7 Claims, 1 Drawing Sheet

MULTI-LAYER STEEL CORD WHERE INTERMEDIATE FILAMENTS ARE COATED WITH A POLYMER

FIELD OF THE INVENTION

The present invention relates to a steel cord which comprises a core, a first layer of intermediate steel filaments twisted around the core, and a second layer of second steel filaments twisted around the first layer. Such a steel cord is often referred to as a multi-layer steel cord.

BACKGROUND OF THE INVENTION

Multi-layer steel cords are known in the art, particularly in the art of tire making. Multi-layer steel cords may reinforce both the breaker or belt plies of a truck tire and the carcass plies of a truck tire. The main function of steel cords in the breaker or belt plies of a tire is to give stiffness to the tire. As the breaker plies of a tire can be replaced by retreading, the mechanical properties required from steel cords in the breaker ply are not extremely high. In great contrast herewith, the mechanical properties required from steel cords for the reinforcement of carcass plies are much higher. One of the reasons is that carcass plies are not replaced during the life time of a tire. As a consequence, a higher strength, a higher degree of flexibility, more structural uniformity, a higher adhesion and adhesion retention level, and a higher durability are expected from steel cords for carcass plies. The higher durability can be expressed as a higher resistance against fatigue and a higher resistance against fretting.

Following prior art steel cord construction has been widely used as reinforcement for the carcass plies of truck tire:

3+9+15×0.175+1 (wrapping filament)SSZS

Tests show that this cord has a bad fretting performance. This is mainly due to the presence of the wrapping filament and due to the point contacts between filaments of different layers, more particularly between filaments of a S-twisted and filaments of a Z-twisted layer.

Omission of the wrapping filament leads to following prior art construction

3+9+15×0.175 SSZ and to some improvement regarding fretting.

Yet another alternative prior art steel cord which has been tried is following construction:

3+8+13×0.175

The difference with the previous construction is that there is one filament omitted in the first layer and two filaments omitted in the second layer. This omittance leads to a decreased degree of compactness with unsaturated layers which allow rubber to penetrate. The penetrated rubber reduces the fretting damage between the filaments.

The best fretting behaviour, however, has been noticed with following prior art construction:

0.20+18×0.175 CC (compact cord).

This construction comprises one thicker core filament and 18 thinner filaments which are twisted with the core filament in the same twisting direction and with the same twisting step. As a result of this twisting geometry, line contacts instead of point contacts are present between the filaments. An additional advantage is reached by the thicker core filament which leads to slightly unsaturated layers which allow rubber penetration. The line contacts together with the rubber penetration are the causes for the good fretting behaviour. However, the core filament remains the most vulnerable element.

SUMMARY OF THE INVENTION

It is an object of the present invention to avoid the drawbacks of the prior art.

It is a further object of the present invention to further improve the fretting behaviour of steel cords.

It is yet another object of the present invention to further increase the durability of steel cords.

According to the invention there is provided a steel cord which comprises a core with one or more core steel filaments, a first layer of intermediate steel filaments twisted around the core, and a second layer of second steel filaments twisted around the first layer. The invention steel cord is characterized in that at least one of the intermediate steel filaments is individually coated by means of a polymer with a minimum thickness of 0.10 mm. The polymer around the intermediate steel filaments considerably reduces the degree of fretting between the intermediate steel filament and any neighbouring filament of the intermediate layer, the second layer or the core.

The minium thickness of the polymer of 0.010 mm, e.g. 0.015 mm or 0.025 mm, means a minimum volume of polymer exceeding the volume of polymer required to fill the interstices between the various steel filaments. This sufficient volume of polymer together with the hardness of the polymer has as consequence that a thin layer of polymer is in most cases still surrounding the individual intermediate steel filaments after the twisting operation. The remaining thin layer avoids steel to steel contacts between the coated intermediate steel filament and the surrounding filaments.

Preferably the polymer is extruded prior to twisting around the intermediate steel filaments.

Preference is to be given to so-called "hard" polymers, in comparison with "soft" polymers. Hard polymers have good mechanical properties and give sufficient resistance against fretting. Hard polymers have following properties: a crystalline melting point above 160° C., a Vicat DIN 53 460 softening point above 150° C., an E-modulus above 500 MPa, preferably above 1000 MPa, a tensile strength above 25 MPa, an elongation above 50%, and a DIN 53 456 hardness above 30 MPa, preferably above 50 MPa, e.g. above 80 MPa.

The hard polymer further has a melt viscosity measured at about 280° C. ranging from 50 Pa·s to 2500 Pa·s for a corresponding shear rate going down from 10000 1/s to 1 1/s. A still more preferable value is a melt viscosity ranging from 50 Pa·s to 1000 Pa·s for a corresponding shear rate going down from 5000 1/s to 20 1/s.

The polymer is preferably selected from a group consisting of polyethylene terephtalate (PET), polybutylene terephtalate (PBT) and polyethylene naphtenate (PEN).

Within the context of the present invention, PET has proved to be the best solution. The terms "polyethylene terephtalate" or "PET" denote not only homopolymers of ethylene terephtalate but also copolymers of ethylene terephtalate containing not more than 20% of other copolymerized units, e.g. derived from other acids than terephtalic acid, such as isophtalic acid or from other glycols than ethylene glycol. The polymer may also contain mixtures of polymers in order to modify certain of the properties thereof.

In comparison with coatings of polyamides such as nylon-6 (PA6), a polyethylene terephtalate coating gives the cable a friction resistance which is equally low. In addition thereto, the polyethylene terephtalate coating has a better adhesion and adhesion retention, has a higher corrosion resistance, has a better resistance against ultra-violet light (i.e. a better weatherability) and has a lower absorption of water or moisture. A polyethylene terephtalate coating absorbs only one tenth of the amount of moisture absorbed by a nylon-6 coating in the same circumstances. This means that a steel cable with a polyethylene terephtalate coating does not swell up to the same degree as a steel cable with a nylon-6 coating. Moreover, application of a polyethylene terephtalate coating can be done in an environment-friendly way, i.e. with a much more simpler pre-treatment and without the use of primers.

In addition to all the advantages already mentioned, a polyethylene terephtalate coating offers a good resistance against abrasion. This latter property is of high importance in the context of the present invention. First of all, in comparison with other polymer coatings, the polyethylene terephtalate coating remains relatively undamaged during the twisting process. Secondly, the resistance against abrasion also reduces the damages resulting from fretting between filaments after the twisting process.

An advantageous embodiment of the present invention has one or more of the following features:
 there is only one core steel filament;
 the number of intermediate steel filaments ranges from three to ten
 all the intermediate steel filaments are individually coated by means of a polymer;
 the core steel filament(s), the intermediate steel filaments and the second steel filaments are all twisted in the same direction and with the same twisting pitch.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
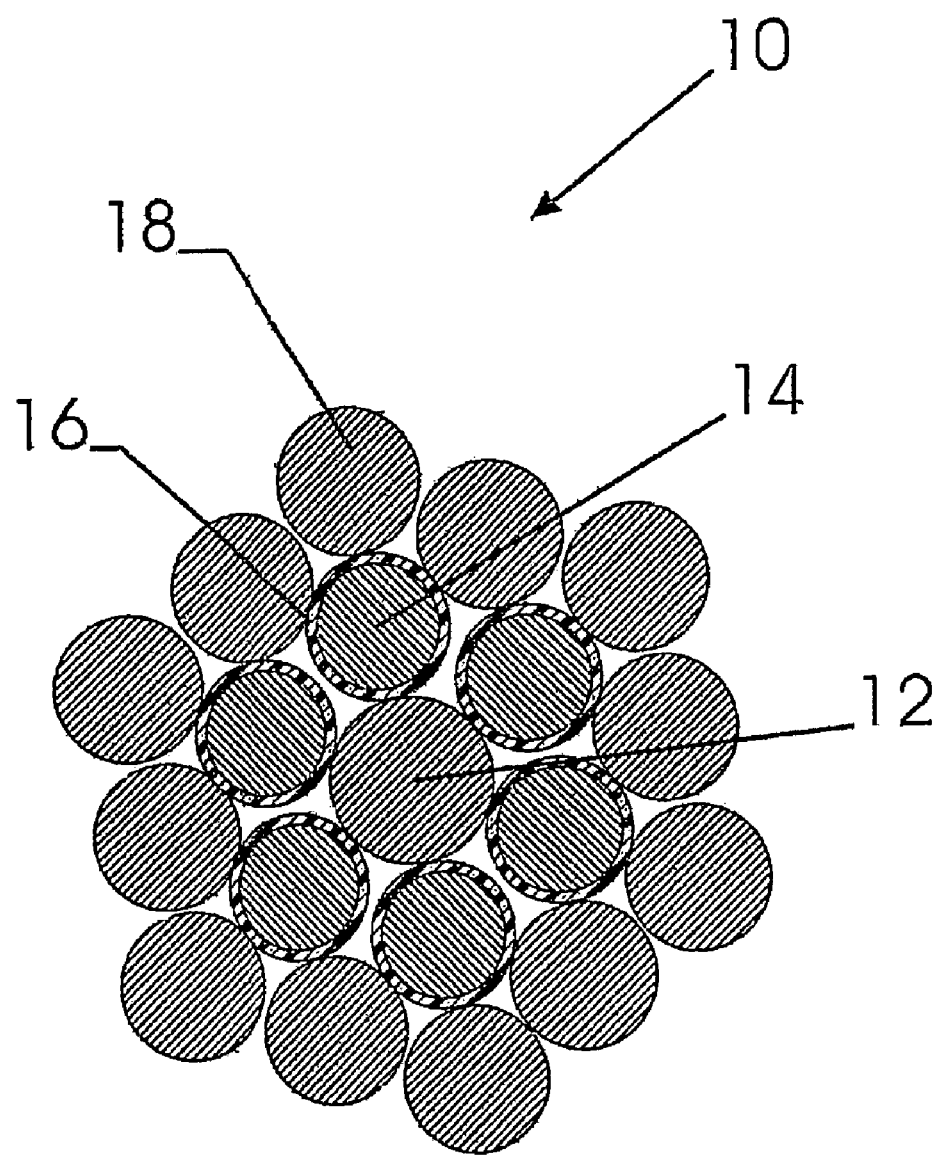
FIG. 1 shows a cross-section of a steel cord according to the present invention.

FIG. 1 shows a cross-section of a preferable embodiment of a steel cord 10 according to the present invention. The steel cord 10 comprises a core steel filament 12 with a diameter of 0.20 mm.

Six intermediate steel filaments 14 are twisted around the core steel filament 12. Each of the intermediate steel filaments 14 is individually coated by means of a polyethylene terephtalate coating 16. This is done by means of an extrusion process on each individual filament prior to twisting. The diameter of the steel cross-section in the intermediate steel filaments is 0.15 mm and the global diameter with inclusion of the polyethylene terephtalate coating 16 is 0.175 mm, but can also be e.g. 0.20 mm.

Twelve second filaments 18 with a diameter of 0.175 mm are twisted around the intermediate steel filaments.

The intermediate filaments 14 and the second filaments 18 are twisted in the same direction and with a same twisting step of 12.5 mm.

From a more global point of view, the thickness of the polyethylene terephtalate coating may vary from 0.010 mm to 0.150 mm, e.g. from 0.015 mm to 0.100 mm. Suitable values of the thickness are 0.020 mm, 0.025 mm, 0.030 mm, 0.035 mm and 0.040 mm.

The polyethylene terephtalate coating 16 around the intermediate steel filaments 14 has following advantages:
 1. there is no steel contact between core filament 12 and the coated intermediate steel filaments 14;
 2. there is no steel contact between the six intermediate steel filaments 14 mutually;
 3. there is no steel contact between the intermediate steel filaments 14 and the second steel filaments 18.

Core filament 12 has a slightly larger diameter (0.20 mm) than the global diameter of the intermediate filaments 14 and than the diameter of the second filaments 18 so that the intermediate layer and the second layer are unsaturated, i.e. not fully occupied and filled with a compact configuration of steel cross-sections. The openings between the second steel filaments may allow the rubber to penetrate between the second steel filaments 18 so that fretting is also reduced between those second steel filaments 18.

The second filaments may be subjected to a plastic deformation, such as polygonal deformation as disclosed in U.S. Pat. No. 5,687,557, in order to further improve the degree of rubber penetration.

After the twisting operation and after vulcanisation the polyethylene terephtalate coating 16 around the intermediate steel filaments 14 will no longer show a circular cross-section as in FIG. 1. Under the influence of the inward force of the second filaments 18 and subsequently of the vulcanisation temperature, the polyethylene terephtalate coating 16 will exhibit some flowing out. However, due to the minimum volume of the present polyethylene terephtalate and due to the hardness of the particular polyethylene terephtalate; the polyethylene terephtalate coating 16 around the intermediate steel filaments 14 will maintain its above-mentioned advantages. Apart from some discrete spots where steel to steel contacts might be present, a thin polyethylene terephtalate coating is always present between the prior coated intermediate steel filaments 14 and all the surrounding filaments, i.e. the neighbouring intermediate filaments 14, the core filament 12 and the facing second filaments 18. Hence, as a rule, polyethylene terephtalate surrounds the intermediate steel filaments and substantially reduces the fretting between the various filaments.

The fretting behaviour has been studied on the invention steel cord and the results have been compared with similar results obtained from prior art steel cords. The table hereunder summarizes the results.

TABLE

| Steel cord construction | Layer | Loss of BL (%) | Dynamic bending | Fretting |
|---|---|---|---|---|
| 3 + 9 + 15 × 0.175 + 1 NT* | 3 | 0 | | 1 |
| 5/10/16/3.5 SSZS | 9 | 1 | | 1 |
|  | 15 | 8 | | 2 |
|  |  |  |  | (3 wrap) |
| 3 + 9 + 15 × 0.175 NT | 3 | 16 | 18 | 2 |
| 5/10/16 SSZ | 9 | 13 | 40 | 2–3 (4) |
|  | 15 | 21 | 37 | 1 |
| 3 + 8 + 13 × 0.175 NT | 3 | 1 | 11 | 1–2 |
| 5/10/16 SSZ | 8 | 16 | 46 | 4 |
|  | 13 | 6 | 22 | 1 |
| 0.20 + 18 × 0.175 CC NT | 1 | 7 | 6 | 2 |
| 12.5 Z | 6 | 6 | 16 | 1–2 |
|  | 12 | 8 | 17 | 1 |
| 0.20 + 6 × 0.15 PC + 12 × 0.175 | 1 | −3 | −6 | 1 |
| CC NT BETRU ® | 6 | 2 | 5 | 1 |

TABLE-continued

| Steel cord construction | Layer | Loss of BL (%) | Dynamic bending | Fretting |
|---|---|---|---|---|
| 12.5 Z thickness coating: 0.025 mm | 12 | 3 | 10 | 1–2 |

*only $40.10^6$ endless belt cycli instead of $100.10^8$
NT = normal tensile strength
CC = compact cord, i.e. all filaments twisted with the same twisting step and in the same direction
PC = polymer coated
BETRU ® = polygonally preformed
BL = breaking load The loss of BL is the percentual loss of breaking load of the individual filaments after an endless belt test of $100.10^6$ cycli ($40.10^6$ for the first prior art steel cord).

The polymer used in the comparison test is a PET, with following properties:
crystallyne melting point: 255–258° C.;
Vicat DIN 53 460 softening point: 180–190° C.
E-modulus DIN 53 457 ISO 527: 2500 MPa;
Tensile strength DIN 53 455-ISO 527: 60 MPa;
Elongation DIN 53 455-ISO 527: >50%;
Hardness DIN 53 456: 120–125 MPa;
Absorption of moisture (20° C., 50% relative humidity): 0.3%.

Dynamic bending is the percentage of loss in number of dynamic bending cycli after an endless belt test of 100.106 cycli ($40.10^6$ for the first prior art steel cord).

The figures given in the last column (fretting) of the table are fretting codes according to following judgment:

| Code | Fretting |
|---|---|
| 0 | No |
| 1 | Little |
| 2 | Moderate |
| 3 | Significant |
| 4 | Heavy |
| 5 | Very heavy |

In a broader perspective, the steel filaments of a steel cord according to the invention usually have a diameter ranging from 0.03 mm to 0.80 mm, and preferably from 0.05 mm to 0.30 mm.

The steel filaments have a composition which is along the following lines: a carbon content ranging from 0.70 to 1.10%, a manganese content ranging from 0.10 to 1.10%, a silicon content ranging from 0.10 to 0.90%, sulphur and phosphorous contents being limited to 0.15%, preferably to 0.010%; additional elements such as chromium (up to 0.20–0.40%), copper (up to 0.20%), nickel (up to 0.30%), cobalt (up to 0.20%) and vanadium (up to 0.30%) may be added.

The final tensile strength $R_m$ of the filaments depends upon its diameter: for example, a 0.2 mm normal tensile filament has a $R_m$ of above about 2800 Megapascal (MPa), a 0.2 mm high tensile filament has a $R_m$ of above about 3400 MPa, a 0.2 mm super high tensile filament has a $R_m$ of above about 3600 MPa and a 0.2 mm ultra high tensile filament has a $R_m$ of above about 4000 MPa.

The steel filaments are coated with a layer that promotes the adhesion to the rubber: copper alloy coatings such as brass (either low-63.5% Cu— and high copper—67.5% Cu) or a complex brass coating (Ni+brass, brass+Co . . . ). Zinc coatings treated with silanes for rubber adhesion are also possible.

The steel cord according to the invention may be manufactured by means of a known tubular twisting machine or preferably by means of a known double twisting device. Coating of the intermediate steel filaments can be done in a separate extrusion process in advance of the twisting process or can be done in one online manufacturing process where the extrusion step precedes the twisting step.

The invention claimed is:

1. A steel cord comprising a core with one or more core steel filaments, further comprising a first layer of intermediate steel filaments twisted around the core, said intermediate steel filaments having an intermediate steel filament diameter, and a second layer of second steel filaments twisted around the first layer, said second steel filaments having a second steel filament diameter, all of the intermediate steel filaments being individually pre-coated with a polymer up to a total intermediate filament diameter, said polymer having a minimum thickness of 0.010 mm, said second steel filament diameter being larger than said intermediate steel filament diameter, wherein the total intermediate filament diameter is equal to or larger than the second steel filament diameter.

2. A steel cord according to claim 1, wherein said polymer is pre-extruded around all intermediate steel filaments.

3. A steel cord according to claim 1, wherein said polymer is selected from a group consisting of polyethylene terephtalate, polybutylene terephtalate and polyethylene naphtenate.

4. A steel cord according to claim 1, wherein said core consists of only one core steel filament.

5. A steel cord according to claim 1, wherein the number of intermediate steel filaments ranges from three to ten.

6. A steel cord according to claim 1 wherein the core steel filaments, the intermediate steel filaments and the second steel filaments are all twisted in the same direction and with the same twisting pitch.

7. A steel cord according to claim 1 wherein steel to steel contact is avoided between the coated intermediate steel filaments and any neighbouring steel filament.

\* \* \* \* \*